United States Patent [19]

Hanenberger

[11] Patent Number: 4,745,986
[45] Date of Patent: May 24, 1988

[54] MOTOR VEHICLE WITH FRONT-MOUNTED TRANSVERSE POWER UNIT

[75] Inventor: Peter-Hans Hanenberger, Wiesbaden-Nordenstadt, Fed. Rep. of Germany

[73] Assignee: General Motors Corporation, Detroit, Mich.

[21] Appl. No.: 63,013

[22] Filed: Jun. 17, 1987

[30] Foreign Application Priority Data

Jun. 27, 1986 [DE] Fed. Rep. of Germany ....... 3621620

[51] Int. Cl.$^4$ ...................... B60K 17/04; B60K 17/22; B60K 17/344
[52] U.S. Cl. .................................. 180/233; 29/401.1; 29/469; 74/606 R; 74/665 H
[58] Field of Search ......... 180/233; 74/606 R, 665 H; 29/401.1, 469

[56] References Cited

U.S. PATENT DOCUMENTS 4,601,359 7/1986 Weismann et al. ................. 180/233

FOREIGN PATENT DOCUMENTS 198812 10/1986 European Pat. Off. ............ 180/233

Primary Examiner—John J. Love
Assistant Examiner—Mitchell J. Hill
Attorney, Agent, or Firm—F. J. Fodale

[57] ABSTRACT

A power unit transversely mounted in a motor vehicle has a differential with optionally provided differential gears and a connection on the housing of a transfer case, to which one of two intermediate members can optionally be attached. One intermediate member has a power take-off shaft which directly drives a propeller shaft leading to the rear-wheel drive for exclusive rear-wheel drive when the differential gears are omitted for exclusive rear-wheel drive. The other intermediate member has a fluid friction clutch which drives the propeller shaft in the case of four-wheel drive.

3 Claims, 2 Drawing Sheets

MOTOR VEHICLE WITH FRONT-MOUNTED TRANSVERSE POWER UNIT

BACKGROUND OF THE INVENTION

The present invention pertains to a motor vehicle with a front-mounted transverse power unit which comprises a gearbox disposed near the engine, a differential housing driven by an output gear of the gearbox and, in a transfer case, a hollow shaft extending parallel to the engine and driven by the differential housing. Motor vehicles with such a power unit are commonly known and in use as motor vehicles equipped with four-wheel drive.

Front-wheel drive vehicles have a disadvantage in terms of traction compared to vehicles with rear drive if their rear axle is loaded more heavily than the front axle due to special bodies, heavy loads in the rear zone of the vehicle or due to a load exerted by a towbar on a trailer coupling of the motor vehicle. If one does not wish to accept this disadvantage, either a vehicle with rear-wheel drive or a vehicle with four-wheel drive must be selected for such purposes.

All the prior-art vehicles with rear-wheel drive have an engine mounted in the longitudinal direction of the vehicle. Both transverse-mounted power units and power units mounted in the longitudinal direction of the vehicle can be encountered in vehicles with four-wheel drive. The vehicle manufacturers normally use their standard vehicle design as the starting point and complement the front-wheel drive by an additional rear-wheel drive or the rear-wheel drive by an additional front-wheel drive. The drive is often designed so that two-wheel drive is achieved again by omitting the additional drive to make it possible to take over as many components of the four-wheel design as possible for the two-wheel drive.

German Pat. No. 31 16 411 issued to Nissan Motor Co. discloses, for example, a vehicle with transverse-mounted power unit and four-wheel drive. It is expressly stated in this document that certain transmission members may be omitted and be replaced by others to obtain a vehicle with front-wheel drive.

SUMMARY OF THE INVENTION

The object of the present invention is to provide a motor vehicle having a transverse-mounted power unit which can be built optionally as a four-wheel drive or front-wheel drive vehicle using as many identical components as possible.

This object is achieved according to the present invention by a transfer case which has a connection for optional connection with a fluid friction clutch which is coupled to a propeller shaft leading to the rear wheel drive or with a power take-off shaft which is directly connected to the propeller shaft leading to the rear wheel drive and which has an outlet which may be closed by a cover, and by a differential gear which has axle shafts leading to the front wheels which may be omitted and which has an outlet which may be closed by a cover.

Due to this design, a vehicle with a transverse-mounted power unit can be optionally equipped with rear-wheel drive exclusively or with four-wheel drive. It is, of course, also possible to equip such a vehicle with front-wheel drive exclusively without extensive conversions. Due to this versatility, it is possible to equip a series manufactured vehicle based on four-wheel drive with a less expensive rear-wheel drive when such a drive is expedient for the vehicle compared with a front-wheel drive for example, in the case of pick-up trucks or vehicles for pulling trailers. The relatively high costs of the four-wheel drive are thus saved.

The expense of the optional equipment of a vehicle with only rear-wheel drive or four-wheel drive is especially low if the intermediate member forms a cover for the rear outlet of the transfer case.

A vehicle according to the present invention is of an especially simple design if a bevel gear is nonrotatably mounted on the hollow shaft, which bevel gear meshes with a bevel gear disposed in a transfer case in the longitudinal direction of the vehicle and which can be optionally connected to the fluid friction clutch or the power take-off shaft.

BRIEF DESCRIPTION OF THE DRAWING

The present invention may have numerous embodiments. To further illustrate its basic principle, one of these embodiments is shown in the drawing and will be described below. In the drawing.

DESCRIPTION OF THE PREFERRED EMBODIMENT

Figure 1:
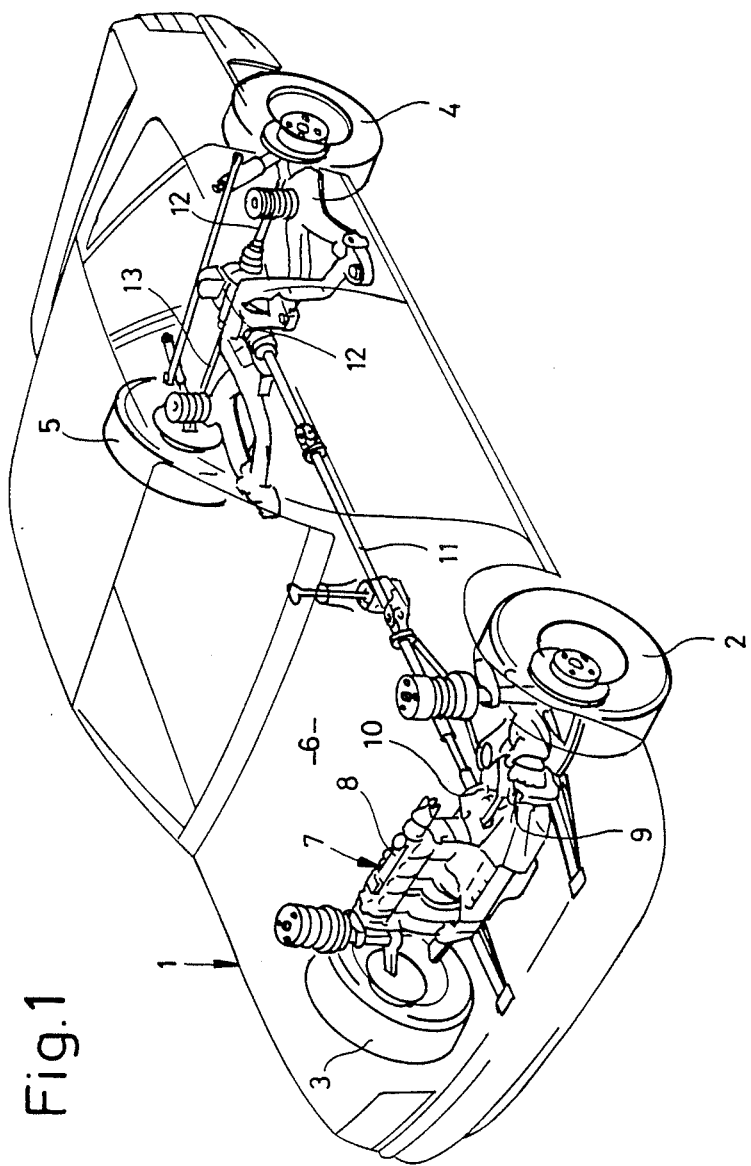
FIG. 1 is a perspective view of a motor vehicle according to the present invention.

Referring now to the drawing, FIG. 1 shows the body 1, the two front-wheels 2, 3 and the rear wheels 4, 5 of a motor vehicle. A power unit 7 which is transversely mounted relative to the longitudinal direction of the vehicle comprises an engine 8, a gearbox 9 and a transfer case 10, is also recognizable under the hood. A propeller shaft 11 leads from the transfer case to the rear to a rear differential 12 from which two drive shafts 12, 13 lead to the respective rear wheels 4, 5.

Figure 2:
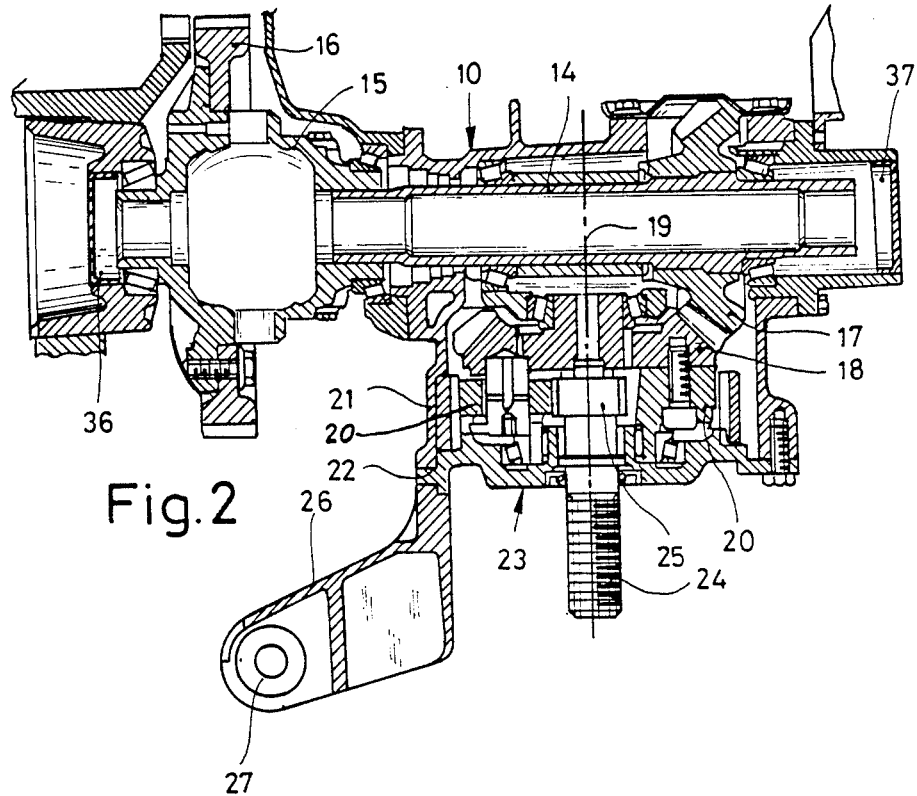
FIG. 2 shows part of the power unit of the motor vehicle of the present invention in a configuration for rear-wheel drive.

The power unit 7 in the region of the transfer case 10 is shown in FIG. 2. FIG. 2 shows a hollow shaft 14, which is nonrotatably connected with a differential case 15. This differential case 15 is driven by a gear 16 which in turn is driven by the gearbox 9 in a conventional manner (not shown). Near the right end of the hollow shaft 14 as seen in the drawing, a bevel gear 17 is nonrotatably mounted on the hollow shaft 14. The bevel gear 17 meshes with a bevel gear 18 which is rotatable about an axis 19 extending in the longitudinal direction of the vehicle. This bevel gear 18 which is provided with planet gears 20 is disposed in a housing 21 which has a connection 22 to which is bolted an intermediate member 23. This intermediate member 23 carries a power take-off shaft 24 which has a sun gear 25 meshing with the planet gear 20 inside the housing 21. The propeller shaft 11 leading to the rear-wheel drive can be directly connected to this power take-off shaft 24.

FIG. 2 also shows that the intermediate part 23 also has an outwardly directed arm 26 on which an engine bearing 27 which forms a fastening point of the power unit 7 is provided.

The embodiment shown in FIG. 2 is intended for exclusive rear-wheel drive. The differential case 15 is therefore empty and contains no gears whatsoever. Furthermore, the lateral outlet of the differential housing is closed by a cover 36 and the corresponding outlet of the transfer case 10 is closed with a cover 37.

Figure 3:
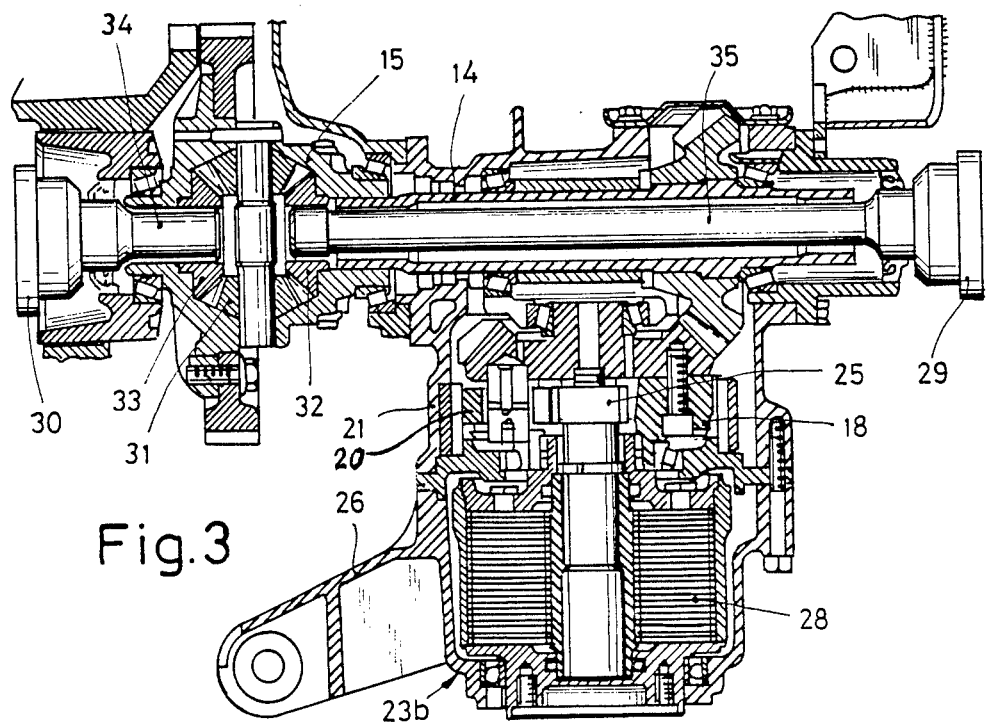
FIG. 3 shows the part of the power unit shown in FIG. 2 in a configuration for four-wheel drive.

In the embodiment shown in FIG. 3, the intermediate part 23 has been replaced by a connection piece 23b which has inside a fluid friction clutch or viscous coupling 28. Exactly as in the case of the power take-off shaft 24 shown in FIG. 2, the fluid friction clutch 28 in this embodiment is driven by the sun gear 25 meshing with the planet gears 20. The propeller shaft 11, which leads from the fluid friction clutch 28 to the rear-wheel drive, is not shown.

The hollow shaft 14 in FIG. 3 contains an axle shaft 35 on whose righthand end is mounted a connection piece 29 for connection of a propeller shaft driving the right front wheel 3. With its other end, the axle shaft 35 reaches into the differential case 15. A corresponding axle shaft 34 with a connection piece 30 is introduced into the differential case 15 from the other side. Of course, unlike the case of the exclusive rear-wheel drive described in connection with FIG. 2, the differential case 15 of FIG. 3 contains the necessary gears 31, 32, 33 forming a differential for driving the axle shafts 34 and 35.

The embodiments of the invention in which an exclusive property or privilege is claimed are defined as follows:

1. A motor vehicle with a front-mounted transverse power unit which comprises a gearbox disposed next to an engine, a differential case driven by an output gear of the gearbox and a transfer case having a hollow shaft extending parallel to the engine and driven by the differential case, characterized in that the transfer case has a connection adapted for optional connection to an intermediate member which comprises a fluid friction clutch and which is coupled to a propeller shaft leading to the rear wheel drive for four-wheel drive, or to an intermediate member which comprises a power take-off shaft and which is directly connected to the propeller shaft leading to the rear-wheel drive for exclusive rear-wheel drive, in that the differential case is optionally provided with differential gears which drive axle shafts which drive the front wheels for front-wheel drive or four-wheel drive, and in that the differential case has a lateral outlet which is closed by a cover and the transfer case has a lateral outlet which is closed by an additional cover when the differential case does not have any gears and the transfer case is connected to the intermediate member which comprises a power take-off shaft and which is directly connected to the propeller shaft leading to the rear-wheel drive for exclusive rear-wheel drive.

2. A motor vehicle according to claim 1, characterized in that the intermediate member forms a cover for the rear outlet of the transfer case.

3. A motor vehicle according to claim 1, characterized in that the hollow shaft of the transfer case has a non-rotatable mounted bevel gear which meshes with a bevel gear disposed in the transfer case in the longitudinal direction of the vehicle and which can be drivingly connected optionally either to the fluid friction clutch or to the power take-off shaft.

* * * * *